C. E. LOWE.
LUBRICATOR FOR HANDSAWS.
APPLICATION FILED AUG. 1, 1908.

915,033.

Patented Mar. 9, 1909.

WITNESSES
George Cherury
Mervyn Wolff

Charles Edward Lowe
INVENTOR

BY
Samuel C. Yeaton, Jr.
ATTORNEY

THE NORRIS PETERS CO., WASHINGTON, D. C.

UNITED STATES PATENT OFFICE.

CHARLES EDWARD LOWE, OF McALESTER, OKLAHOMA, ASSIGNOR OF ONE-HALF TO WALTER CARL ELLIS, OF GUTHRIE, OKLAHOMA.

LUBRICATOR FOR HANDSAWS.

No. 915,033.      Specification of Letters Patent.      Patented March 9, 1909.

Application filed August 1, 1908. Serial No. 446,414.

*To all whom it may concern:*

Be it known that I, CHARLES EDWARD LOWE, a citizen of the United States, and a resident of McAlester, Pittsburg county, Oklahoma, have invented new and useful Improvements in Lubricators for Handsaws, of which the following is a full, clear, and exact specification.

My invention relates to lubricators for handsaws and is designed to fit within a chamber formed in the handle of the saw from which position it is operated to lubricate the saw blade.

Figure 1:
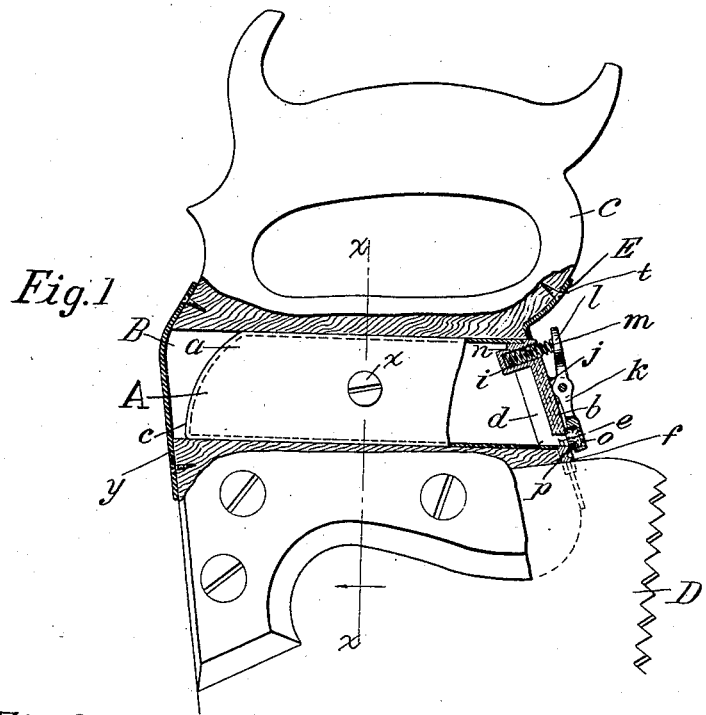
Figure 2:
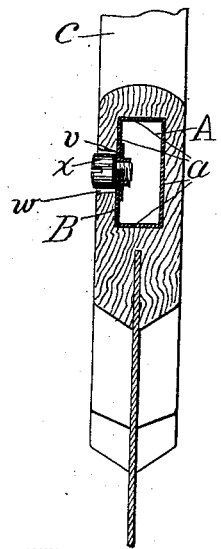
Figure 3:
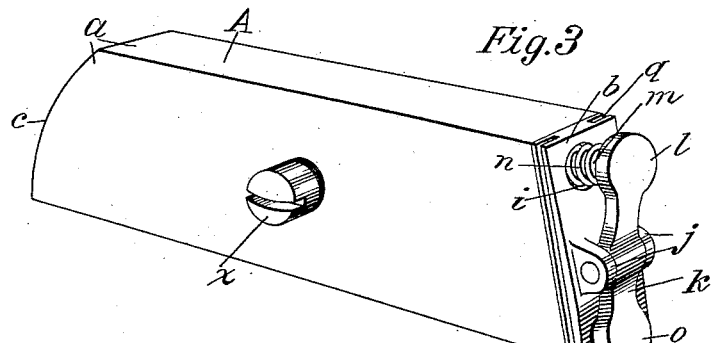
Figure 4:
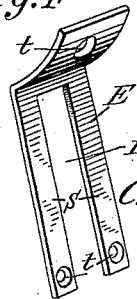

Referring to the drawings forming part of this specification, Figure 1 shows a saw equipped with my lubricator, the recessed portion of the handle being shown in section and the lubricator being broken away to show a part of the interior. Fig. 2 is a sectional view of Fig. 1 taken through the plane $x$—$x$. Fig. 3 is a perspective view of my lubricator removed from the saw, and Fig. 4 is a perspective view of the face plate for securing the lubricator within the saw handle.

The lubricator A may be of any convenient shape and size to conform to the style of saw handle with which it is to be used. With the ordinary hand saw it is preferably made long and narrow to adapt it to fit the entire distance through the handle but without materially weakening the handle when forming the retaining chamber.

The lubricator may be made of sheet metal or may be cast. As shown in the drawings it resembles a rectangular box or can having the four sides $a$ and a front and back $b$ and $c$ respectively.

A chamber B is mortised in the handle C of the saw D into which the lubricator is snugly fitted. The lubricator may if desired be cylindrical and a hole may be bored in the handle to receive it, but a rectangular recess in most cases is preferable as it gives a large volume without weakening the handle. The back $c$ of the lubricator is slightly rounded to facilitate an easy insertion of it within the chamber B. The front of the lubricator may be made integral with the sides or it may be made separate as where sheet metal is used for the sides. The front may be soldered to the sides or secured by any of the other well known means.

Where the front plate $b$ is made separate it is best provided with a flange $d$ for better securing it to the lubricator sides. The plate $b$ is given a suitable angle to conform it to the handle of the saw. It is provided near its bottom with a hole $e$ communicating with the interior of the lubricator and affording an exit for the oil. This hole is above and preferably in line with the saw blade. The plate $b$ extends below the lubricator forming a lip $f$. In the center of the lip is a slit $g$ into which fits the blade of the saw and permits the lip $f$ to extend downward for a suitable distance on either side of the blade. On either side of the slit $g$ grooves $h$—$h$ are formed extending from the edge of the lip to the hole $e$. These aid in feeding the oil coming from the lubricator to both sides of the blade at the same time.

At the upper end of the plate $b$ is a depression $i$ and midway on the plate are lugs $j$—$j$. Between these lugs and pinned to them is a lever $k$. The upper end of the lever is provided with a thumb piece $l$ behind which projects a pin $m$. A helical spring $n$ is loosely fitted over this pin at one end and the other end is seated in the depression $i$. The lower end of the lever $k$ is shaped to fit squarely over the hole $e$. A recess $o$ is formed in the back of this end of the lever and a rubber plug $p$ or some similar substance is secured therein. The exposed face of this plug fits snugly upon the hole to close it and hold back the oil when not needed. This is a simple and effective method of closing the outlet but many other methods may do as well.

On the sides of the plate $b$ are grooves $q$—$q$. To retain the lubricator in secured position within the saw handle a facing plate E is used. This has an open slot $r$ cut in it, thus forming the two prongs $s$—$s$ which are slid into the grooves $q$—$q$ from the top thereof downward. Screw holes $t$—$t$ are provided in the top and bottom of the plate E for screwing it to the saw handle. The top of the plate is given a convenient bend to fit upon the rounded part of the handle.

Where the sides of the lubricator are thin and resilient as where sheet metal is used, the flow of the oil may be increased by pushing the side in when the outlet is opened, in the usual way that oil cans are operated. To accomplish this, a hole is made in one side of the lubricator and is reinforced by the flanged ring $v$ having an internal screw thread. A hole $w$ is made in the handle to register with this opening to permit a screw $x$ to be screwed therein. This opening also affords an easy way of refilling the lubricator when necessary. Where the chamber to retain the lubricator is mortised entirely through the handle, then a facing plate $y$ should be screwed on to the handle to cover the opened end of the chamber.

My lubricator is easily installed in a saw handle after the mortise is made. The plate E is first slipped in place within the grooves $q-q$ and the lubricator pushed into the handle, the rounded end $c$ helping in inserting it. The plate E is then screwed on to the handle to secure the lubricator in place. It is then filled through the side opening and the screw $x$ screwed in. It is best to use a soft washer on the screw to make a tight joint. When it is desired to oil the saw the thumb end of the lever is pushed in. This raises the other end and opens the lubricator. The oil then flows down both sides of the blade and may be spread around by the hand if necesssary. When the pressure is removed from the lever the spring reacts, and the plug $p$ securely closes the hole.

Where the lighter oils are used, such as kerosene, it may not be found necessary to force in the side of the lubricator to increase the flow, except where the opening is made small and a quick flow is desired. But where the heavier oils are used, pushing in the side by means of the screw plug $x$ will aid materially in forcing a flow against the atmospheric pressure.

Having thus described my invention I claim—

1. A lubricator for a hand saw comprising a reservoir adapted to fit wholly within a chamber formed in the handle beyond the end of the blade and transversely thereto and having an exposed face beneath the handle when inserted, an opening in the said face to emit the oil and means for closing the opening when the flow of oil is not desired.

2. A lubricator for a hand saw adapted to fit within a chamber formed in the handle and having an exposed face when inserted, a hole in the face to emit the oil, a lever secured to the face, one end of said lever adapted to close the hole in the face, the lever being adapted to be operated at the other end to effect a raising and lowering of the first end from and over the said opening respectively to effect an opening and closing of the hole.

3. A lubricator for a hand saw adapted to fit within a chamber formed in the handle and having an exposed face when inserted, an opening in the face near the bottom to emit the oil, a depression formed near the top, a pair of lugs formed on the plate between the hole and depression, a lever pivoted to said lugs, one end of said lever adapted to cover the hole, the other end having a pin projecting from its back, a spring mounted on said pin and seated in said depression, forcing the said end of the lever upward operating it to bring the first end down in spring pressed engagement over the hole to close it, and means for securing the lubricator in position.

4. A lubricator for a hand saw adapted to fit within a chamber formed in the handle and having an exposed face when inserted, an opening in the face near the bottom to emit the oil, a depression formed near the top, a pair of lugs formed on the plate between the hole and depression, a lever pivoted to said lugs, one end of said lever faced with a pliable material to adapt it to cover the hole, the other end having a pin projecting from its back, a spring mounted on said pin and seated in said depression forcing the end of the lever upward operating it to close the hole at the other end, means for securing the lubricator in position, a screwthreaded hole formed in one side of the lubricator, for filling the lubricator, a screw plug to close said hole extending through a corresponding hole in the handle and serving also as a thumb piece to force the side of the lubricator in when made flexible to aid in ejecting the oil.

5. A lubricator for a hand saw adapted to fit within a chamber formed in the handle and having an exposed face when inserted, an opening in the face near the bottom to emit the oil, a depression formed near the top, a pair of lugs formed on the plate between the hole and depresssion, a lever pivoted to said lugs, one end of said lever faced with a pliable material to adapt it to cover the hole and the other end having a pin projecting from its back, a spring mounted on said pin and seated in said depression forcing the end of the lever upward operating it to close the hole at the other end, a locking plate fitting in grooves formed in the side of the said exposed face and provided with screw holes for securing it to the saw handle, a screwthreaded hole formed in one side of the lubricator, for filling the lubricator, a screw plug to close said hole extending through a corresponding hole in the handle and serving also as a thumb piece to force the side of the lubricator in when made flexible to aid in ejecting the oil.

CHARLES EDWARD LOWE

Witnesses:
 FRANK SMITH,
 JOHN B. CHALLES.